3,219,699
TETRAALKYLAMMONIUM THIOPHENOXIDES
Robert Ehrlich, 490 Sussex Ave., and Donald D. Perry, 17 Rosemilt Place, both of Morristown, N.J., and Murray S. Cohen, Symor Drive, Convent Station, Morristown, N.J.
No Drawing. Filed May 9, 1963, Ser. No. 280,494
17 Claims. (Cl. 260—567.6)

This invention concerns the preparation of a novel class of quaternary ammonium salts useful as intermediates in organic synthesis.

More particularly, this invention relates to the preparation of tetraalkylammonium thiophenoxide and tetraalkylammonium substituted thiophenoxides which are used as intermediates in the preparation of a valuable group of reducing agents, the tetraalkylammonium aluminohydrides.

The novel compounds of this invention are included within the scope of the formula:

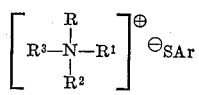

wherein R, $R^1$, $R^2$ and $R^3$ which can be the same or different are alkyl radicals, straight chains or branched chains joined, or conjoined, preferably up to 8 carbon atoms and Ar is an aryl radical, unsubstituted or substituted with groups such as halogens and/or alkyl radicals containing up to 2 carbon atoms.

Illustrative of the many tetraalkylammonium thiophenoxides intended to be included within the scope of this invention are those compounds where all four alkyl substituents are the same such as:

tetramethylammonium thiophenoxide,
tetraethylammonium thiophenoxide,
tetraisopropylammonium thiophenoxide,
tetra-n-propylammonium thiophenoxide,
tetra-n-butylammonium thiophenoxide,
tetraisobutylammonium thiophenoxide,
tetra-n-amylammonium thiophenoxide,
tetra-n-hexylammonium thiophenoxide,
tetra-n-heptylammonium thiophenoxide,
tetra-n-octylammonium thiophenoxide,
tetra-methylammonium-p-methyl thiophenoxide,
tetraethylammonium-n-chloro thiophenoxide,
tetrabutylammonium-3,4-diethyl thiophenoxide, and tetrahexylammonium-3,4-dichloro thiophenoxide as well as those compounds where the one or more of the alkyl substituents differ such as:

trimethylethylammonium thiophenoxide,
trimethyl-n-propylammonium thiophenoxide,
dimethyl-n-dihexylammonium thiophenoxide,
dimethyl-diethylammonium thiophenoxide,
triethyl-n-propylammonium thiophenoxide,
triethyl-n-octylammonium thiophenoxide,
trimethyl-n-octylammonium thiophenoxide,
dimethyl-n-propyl-n-hexylammonium thiophenoxide and the like.

In a co-pending application, Ser. No. 280,495, filed in the United States Patent Office May 9, 1963, the preparation of the tetraalkylammonium aluminohydrides is described in some detail. These novel compositions which have utility among other things as reducing agents, are prepared in some instances by contacting a source of aluminum hydride such as lithium aluminum hydride with an appropriate tetraalkylammonium salt such as a halide, in the presence of an anhydrous inert solvent under moderate reaction conditions.

Unfortunately, as described in the co-pending application, because of the highly ionic characteristics of the quaternary ammonium intermediates when each of the alkyl substituents have less than 6 carbon atoms, yields are poor and the direct process is less than satisfactory. To overcome the inherent problems caused by the strong ionic strength and poor solubility of the lower alkyl substituents an indirect process was sought to prepare the lower alkyl substituent compositions in good yield. An alternative process required the use of a tetraalkylated ammonium intermediate which had at least fair organic solvent solubility coupled with moderate ionic strength. The likely tetraalkylammonium phenoxides proved to be unsatisfactory as reaction intermediates and an investigation was undertaken to find suitable intermediates. After much study it was found that the use of the thiophenols and substituted thiophenols which gave rise to the corresponding tetraalkylammonium thiophenoxides and substituted thiophenoxides intermediates had the correct combination of solubility and moderate ionic strength required to make the process operable even for the highly ionic lower alkyl substituents. This superior performance of the thiophenols and substituted thiophenols is unexpected in several respects. For example, not only are the yields of the quaternary ammonium aluminohydride products increased severalfold over what was obtained when the related oxygen containing phenols are used, but in view of the established similarity of reactivity and types of reactions that both the phenols and thiophenols undergo, it was most surprising to find that the thiophenoxides were satisfactory as intermediates whereas the corresponding phenoxides were not. An unrelated but not unimportant attribute which the quaternary alkylammonium thiophenoxides and substituted quaternary alkylammonium thiophenoxides possess is as solubilizing or purifying agents in the processing and purification of fine chemicals, particularly in the pharmaceutical-chemical industries. For example, in contrast to most lower tetraalkylammonium salts which are very ionic compounds soluble only in water or to a limited extent in alcohols, the tetraalkylammonium thiophenoxides and substituted thiophenoxides have good water solubility and fairly good solubility in many organic solvents. For example, the compositions of this invention are soluble in ethers both aliphatic and cyclic as well as other oxygenated organic solvents such as the Cellosolves and the like. This good solubility in both polar and non-polar solvents makes the tetraalkylammonium thiophenoxide salts amenable to use as means of separating contaminants and impurities from a variety of fine chemicals in situations where the corresponding quaternary ammonium salts are unsatisfactory.

It is therefore an object of this invention among others to prepare a novel series of tetraalkylammonium thiophenoxides heretofore unreported in the literature.

It is another object of this invention to prepare intermediates for the preparation of the lower alkyl derivatives of the tetraalkylammonium aluminohydrides in good yield.

It is a further object of this invention to prepare a series of compounds that are useful in the preliminary isolation and purification of weakly basic fine chemical and pharmaceuticals through the formation of stable and soluble salts.

The above objects among others are accomplished by contacting a tetraalkylammonium salt such as a halide, nitrate, hydroxide or the like with a thiophenol or substituted thiophenol in the presence of an excess of an inert solvent such as water, the aliphatic alcohols, the aliphatic ketones and oxygenated organic solvents including the ethers, or mixtures of one or more of these solvents. While the success of the preparative process is not predicated upon any specific mechanism, the overall reaction appears to be as set forth below:

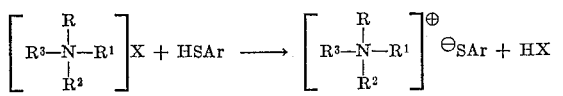

wherein R, R¹, R² and R³ which may be the same or different are alkyl radicals preferably containing up to 8 carbon atoms, X is a negative cation and Ar is an aryl radical selected from the group consisting of phenyl, chlorinated phenyl, alkylated phenyl, and halogenated and alkylated phenyl radicals, said alkyl radicals containing from 1 to 2 carbon atoms.

The term "substituted thiophenols" as used throughout this application includes the mono-, di-, and polyalkylated and mono-, di-, and polyhalogenated thiophenols as well as thiophenols having both halogen and alkyl substituents.

The term "substituted phenyl" as used throughout this application refers to the mono-, di-, and polyalkylated as well as mono-, di-, and polyhalogenated phenyl radicals as well as to phenyl radicals containing both halogen and alkyl substituents.

In the preferred process embodiment a lower alkylated salt such as the tetramethylammonium hydroxide in water solution is contacted with a thiophenol or an alkylated thiophenol. The thiophenol can be added in the form of an aqueous suspension or the thiophenol can be added by itself without any other solvent. The reactants are then vigorously stirred until the thiophenol is largely dissolved. Preferably the stirring is conducted in the presence of an inert atmosphere such as is afforded by nitrogen, neon, argon, and the like. The purpose of the inert atmosphere is to minimize the chances for accidental atmospheric oxidation. After an additional period of stirring ranging from 1/10 hour to 6 hours the negative cation is substantially displaced and the product is ready for isolation. The reaction solution is clarified to remove any insoluble by-product sulphides or polysulphides and the solvent (water in this case) is stripped off under a moderate vacuum. The product is then dried by heating to 50–80° C. under reduced pressure such as can be obtained by an efficient oil or mercury vacuum pump.

In its process aspects the invention is advantageous in several respects. Among these are moderate and flexible reaction conditions, readily available reactants and good yields.

For example, there is no required order of adding the reactants and the reactants can be used in the form of their aqueous or alcoholic solutions. In addition, the tetraalkylammonium reactant can be utilized in the form of the hydroxide, halide or any other stable negative cation. The ratio of the reactants to each other is not critical although a ratio approaching stoichiometric proportions is preferred.

As indicated, the reaction is customarily run at ambient temperature and at atmospheric pressures. However, higher and lower temperatures can be used except that lower temperatures unduly extend the reaction time without any concomitant gain, while higher temperatures tend to increase the amount of competing side reactions. Similarly the reaction can be operated at sub- through super atmospheric pressures. However, little or no advantage has been observed when other than atmospheric pressures are used. For these reasons it is preferred to operate the reaction under near ambient temperatures and atmospheric pressures. The reaction time ordinarily varies between 1/10 to 6 hours depending upon the batch size and the reactants used. More ordinarily, the reaction is substantially complete between 30 minutes and 2 hours. As indicated earlier, while water is the preferred reaction solvent, water-alcohol, alcohols, ketones and the like can be used alternatively. The removal of water from the product while most conveniently accomplished under vacuum can be done at atmospheric pressures with a consequent increase in the drying cycle.

Many of the reactants of this process are commercially available or can be made using known synthetic procedures or modifications of known synthetic procedures. For example, many of the lower alkyl quaternary ammonium salts or hydroxides are commercially available. Solutions of the various tetraalkylammonium hydroxides can be obtained among other methods by treating the halides or other salts with a heavy metal oxide or hydroxide. An instance of this is the preparation of the tetramethylammonium hydroxide from the chloride by reacting the chloride with moist silver oxide. The quaternary salts can be prepared when not commercially available by exhaustively alkylating ammonia with alkylating agents such as the alkyl halides, dimethyl sulfate or the like. Another well known method of preparing the quaternary ammonium salts is by the addition of an alkyl halide to a tertiary amine.

Similarly, the thiophenols and substituted thiophenols are known compounds or can be made from known compounds. Among the many methods of making the thiophenols is by the reduction of the appropriate arylsulphonyl halide by zinc or other reducing agents as well as by the action of phosphorous pentasulphide on phenols or substituted phenols. Yet another method is by the conversion of diazonium salts into aromatic disulphide through the reaction of the diazonium salt with sodium sulphide, then reducing the formed disulphide to the thiophenol or substituted thiophenol by introducing hydrogen into the molecule over a palladium or platinum hydrogenation catalyst.

While this invention is primarily valuable as a preparative process it does possess some advantages in its composition aspects. For example, it is believed that the tetraalkylammonium thiophenoxides products have not been previously described. As indicated supra, these products not only are valuable intermediates for preparing the tetraalkylammonium aluminohydrides, but can also be used to precipitate and purify certain weakly basic fine chemicals and pharmaceuticals from solution and can in some instances serve as a convenient means of preparing physiologically active drugs in a therapeutic form. The explanation for these unusual uses is believed to lie in the unique combination of physical properties that these compositions possess. That is, good water solubility and fair solubility in organic solvents coupled with a weakly ionic character.

To more fully set forth the details of the workings of this invention as well as the utility of the products, the following illustrative examples are submitted.

EXAMPLE 1.—PREPARATION OF TETRAMETHYLAMMONIUM THIOPHENOXIDE

To an appropriately sized reaction vessel fitted with stirring, heating and cooling means are added 455 parts by weight of tetramethylammonium hydroxide as a 10% aqueous solution, and 551 parts by weight of thiophenol. The reactants are stirred until the thiophenol is dissolved under a nitrogen atmosphere. A small amount of precipitate, which proved to be diphenylsulfide, forms and is removed by filtration. The water is stripped off at 45° C. under vacuum and the product is dried at 70° C. and under high vacuum for 24 hours. A 898 parts by weight portion of an off-white solid product is obtained. The product melted at 144–145° with decomposition and the infra-red spectrum showed no —SH or OH absorption.

EXAMPLE 2.—PREPARATION OF TETRAETHYLAMMONIUM THIOPHENOXIDE

To a conveniently sized reaction vessel fitted with stirring, heating and cooling means are added a 10% by weight aqueous solution containing 785 parts by weight of tetraethylammonium hydroxide, and 551 parts by weight of thiophenol. The reactants are stirred under a nitrogen atmosphere until the thiophenol is dissolved. A precipitate of diphenylsulfide which appears is removed by filtration. The solvent water is stripped off under vacuum at 45° C. over the course of several hours. The residual water is removed from the off-white product by heating under a high vacuum at 65° C. for 20 hours. A substantially quantitative yield of tetraethylammonium thiophenoxide product is obtained. Infra-red analysis showed no —SH or —OH absorption and elemental analysis confirmed the identity of the product.

EXAMPLE 3.—PREPARATION OF TETRA-n-PROPYLAMMONIUM THIOPHENOXIDE

To a stirred solution of 9.3 parts by weight of tetrapropylammonium hydroxide in 90 parts by weight of water, under a nitrogen atmosphere, is added 5.5 parts by weight of thiophenol until dissolution is complete. A small quantity of precipitate which forms is filtered off. The water is stripped off at 50° C. under strong vacuum and the tetra-n-propylammonium thiophenoxide dried at 65° C. under vacuum for 24 hours. At the end of the drying time an off colored solid substance is obtained in substantially quantitative yield. Analysis of the intermediate product shows a negative —SH or —OH absorption, and elemental analysis confirmed the identity of the product to be the tetra-n-propylammonium thiophenoxide.

EXAMPLE 4.—PREPARATION OF TETRA-n-BUTYLAMMONIUM THIOPHENOXIDE

Using the procedure described in Examples 1 and 2 tetra-n-butylammonium thiophenoxide is prepared by reacting equi-molar quantities of tetra-n-butylammonium hydroxide and thiophenol in an aqueous solution and under a nitrogen atmosphere. A near quantitative yield of intermediate is obtained. Infra-red absorption and elemental analysis of the intermediate corroborated its identity.

EXAMPLE 5.—PREPARATION OF TETRA-n-PENTYLAMMONIUM THIOPHENOXIDE

Using the procedure described in Examples 1 and 2 tetra-n-pentylammonium thiophenoxide is prepared by reacting equi-molar quantities of tetra-n-pentylammonium hydroxide and thiophenol in an aqueous solution and under a nitrogen atmosphere. A near quantitative yield of intermediate is obtained. Infra-red absorption and elemental analysis of the intermediate corroborated its identity.

EXAMPLE 6.—PREPARATION OF TETRA-n-HEXYLAMMONIUM THIOPHENOXIDE

Using the procedure described in Examples 1 and 2 tetra-n-hexylammonium thiophenoxide is prepared by reacting equi-molar quantities of tetra-n-hexylammonium hydroxide and thiophenol in an aqueous solution and under a nitrogen atmosphere. A near quantitative yield of intermediate is obtained. Infra-red absorption and elemental analysis of the intermediate corroborated its identity.

EXAMPLE 7.—PREPARATION OF DIMETHYL-DIHEXYLAMMONIUM THIOPHENOXIDE

To a stirred solution of 6.9 parts by weight of dimethyl-dihexylammonium hydroxide in 40 parts by weight water, kept under a nitrogen atmosphere, is added 3.3 parts by weight of thiophenol until dissolution is complete. The solution is clarified by filtration and the water stripped off under 50° C. under vacuum. The intermediate product is dried at 60° C. under vacuum for 24 hours. At the end of this time the off-colored intermediate is obtained in substantially quantitative yield. Infra-red analysis indicates that no —SH or —OH groups are present and elemental analysis confirmed that the composition is the desired dimethyl-dihexylammonium thiophenoxide.

EXAMPLE 8.—PREPARATION OF DIMETHYL-DIETHYLAMMONIUM THIOPHENOXIDE

Using the procedure described in Examples 1 and 2, dimethyl-diethylammonium thiophenoxide is prepared by reacting equi-molar quantities of dimethyl-diethylammonium hydroxide and thiophenol in an aqueous solution and under a nitrogen atmosphere. A near quantitative yield of intermediate is obtained. Infra-red absorption and elemental analysis of the intermediate corroborated its identity.

EXAMPLES 9–12.—PREPARATION OF OTHER REPRESENTATIVE PRODUCTS

Using the procedures described in Examples 1 and 2, the following representative products are obtained in good yield. The reactants obtained and products utilized are indicated.

| Example | Reactants | Product obtained |
|---|---|---|
| 9 | Tetramethylammonium bromide and p-methyl thiophenol. | $[(CH_3)_3N-CH_3]^{\oplus}$ $^{\ominus}S-C_6H_4-CH_3$ |
| 10 | Tetraethylammonium chloride and meta chloro thiophenol. | $[(C_2H_5)_3N-C_2H_5]^{\oplus}$ $^{\ominus}S-C_6H_4-Cl$ |
| 11 | Tetrabutylammonium hydroxide and 3,4-diethyl thiophenol. | $[(C_4H_9)_3N-C_4H_9]^{\oplus}$ $^{\ominus}S-C_6H_3(C_2H_5)_2$ |
| 12 | Tetrahexylammonium chloride and 3,4-dichloro-thiophenol. | $[(C_6H_{13})_3N-C_6H_{13}]^{\oplus}$ $^{\ominus}S-C_6H_3Cl_2$ |

EXAMPLE 13.—UTILITY EXAMPLE USING REPRESENTATIVE PRODUCT OF THIS INVENTION

In a convenient reaction vessel fitted with means for heating, cooling and stirring is added a solution of 87 parts by weight of tetramethylammonium thiophenoxide in 880 parts by weight of anhydrous tetrahydrofuran and 20 parts by weight of lithium aluminum hydride in 400 parts by weight of anhydrous tetrahydrofuran. The tetramethylammonium thiophenoxide is derived from the preparation of Example 1. The reaction mixture is stirred for 2 days at 63° C. under a nitrogen atmosphere and filtered. The white solid is washed thoroughly with additional anhydrous tetrahydrofuran and dried in vacuum for 6 hours at room temperature. A yield of near 90% of theory is obtained. The analysis and infra-red spectrum confirmed the identity of the product as tetramethylammonium aluminohydride whose utility as a reducing agent is disclosed in Ser. No. 280,495 filed May 9, 1963.

Using the same procedure, equipment and techniques described above, the thiophenoxide products prepared in Examples 2–5, 7 and 8 are reacted with lithium aluminum hydride in inert solvent to obtain the corresponding tetraalkylammonium aluminohydride. The detailed preparations are disclosed in the above Ser. No. 280,495.

EXAMPLE 14.—ADDITIONAL UTILITY EXAMPLES USING OTHER REPRESENTATIVE PRODUCTS OF THIS INVENTION

The same procedure, equipment and techniques are used as described previously in Example 13, except that the intermediates used is the tetraethylammonium (meta-chloro)-thiophenoxide of Example 10. The product obtained by the reaction of lithium aluminum hydride with this thiophenoxide is the tetraethylammonium aluminohydride. Again structure is confirmed by the physical characteristics of the product.

It is to be understood that the above examples are merely illustrative of this invention and do not limit its scope. Numerous changes and modifications can be made in reactants, solvents and reaction conditions generally without departing from the scope of this invention as defined by the claims.

We claim:
1. Tetraalkylammonium thiophenoxides of the structure:

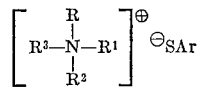

wherein R, $R^1$, $R^2$, and $R^3$ are alkyl radicals containing up to 8 carbon atoms and Ar is an aryl radical selected from the group consisting of phenyl chlorinated phenyl and alkylated phenyl where the alkyl groups contain up to 2 carbon atoms.
2. The thiophenoxide of claim 1 where aryl is phenyl.
3. The thiophenoxide of claim 1 wherein the alkyl groups are the same.
4. Tetramethylammonium thiophenoxide.
5. Tetraethylammonium thiophenoxide.
6. The thiophenoxide of claim 1 where the aryl radical is phenyl and R, $R^1$, $R^2$, and $R^3$ radicals are propyl.
7. The thiophenoxide of claim 1 where the aryl radical is phenyl and R, $R^1$, $R^2$, and $R^3$ radicals are butyl.
8. The thiophenoxide of claim 1 where the aryl radical is phenyl and R, $R^1$, $R^2$, and $R^3$ radicals are pentyl.
9. The thiophenoxide of claim 1 where the aryl radical is phenyl and R, $R^1$, $R^2$, and $R^3$ radicals are hexyl.
10. The thiophenoxide of claim 1 where the alkyl groups are dissimilar.
11. Dimethyl-dihexylammonium thiophenoxide.
12. Dimethyl-diethylammonium thiophenoxide.
13. The thiophenoxide of claim 1 where the aryl radical is a chlorinated phenyl.
14. Tetramethylammonium-p-methylthiophenoxide.
15. Tetraethylammonium-meta-chlorothiophenoxide.
16. Tetrahexylammonium-3,4-diethylthiophenoxide.
17. Tetrahexylammonium-3,4-dichlorothiophenoxide.

References Cited by the Examiner
UNITED STATES PATENTS
2,383,775   8/1945   Craig et al. _____ 260—567.5 X CHARLES B. PARKER, *Primary Examiner.*

C. D. QUARFORTH, *Examiner.*